United States Patent [19]

Clendinning et al.

[11] Patent Number: 4,829,143

[45] Date of Patent: * May 9, 1989

[54] MODIFIED POLY(ARYL ETHER KETONES) DERIVED FROM BIPHENOL

[75] Inventors: Robert A. Clendinning, New Providence; Donald R. Kelsey, Hillsborough, both of N.J.

[73] Assignee: Amoco Corporation, Chicago, Ill.

[*] Notice: The portion of the term of this patent subsequent to Aug. 23, 2005 has been disclaimed.

[21] Appl. No.: 56,092

[22] Filed: May 29, 1987

Related U.S. Application Data

[63] Continuation-in-part of Ser. No. 924,068, Oct. 28, 1986, U.S. Patent 4,766,197.

[51] Int. Cl.$^4$ .................. C08G 8/02; C08G 14/00
[52] U.S. Cl. .................. 528/125; 528/126; 528/128; 528/173; 528/176; 528/179
[58] Field of Search .............. 528/125, 126, 128, 173, 528/176, 179

[56] References Cited

U.S. PATENT DOCUMENTS 3,956,240 5/1976 Dahl et al. ..................... 528/176
4,717,761 1/1988 Staniland ........................ 528/125

Primary Examiner—John Kight
Assistant Examiner—M. L. Moore
Attorney, Agent, or Firm—Frederick S. Jerome; William H. Magidson; Ralph C. Medhurst

[57] ABSTRACT

Described herein are poly(aryl ether ketones) derived from biphenol which can be improved by incorporating bisphenol comonomers. The resulting polymers have lower melting points while the Tg is essentially unchanged resulting in good mechanical and crystallization properties.

4 Claims, 1 Drawing Sheet

MOLE % BIPHENOL IN COPOLYMER

FIGURE
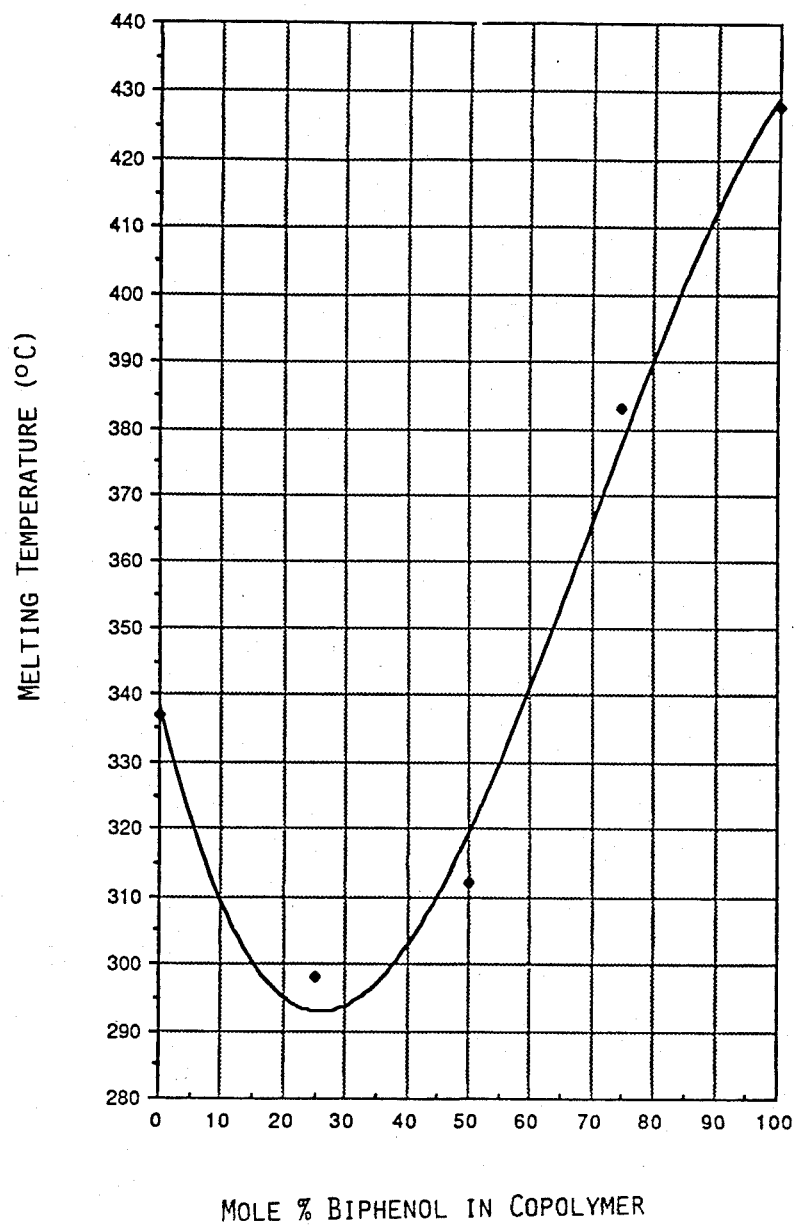

MODIFIED POLY(ARYL ETHER KETONES) DERIVED FROM BIPHENOL

CROSS-REFERENCE TO RELATED APPLICATION

This application is a continuation-in-part of U.S. patent application Ser. No. 924,068, filed Oct. 28, 1986 now U.S. patent No. 4,766,197.

FIELD OF THE INVENTION

Described herein are modified crystalline poly(aryl ether ketones) derived from biphenol, having improved processability. The modification comprises the incorporation of bisphenol comonomers.

BACKGROUND OF THE INVENTION

Poly(aryl ether ketones) are known crystal-line polymers. They offer an exceptional balance of properties; namely high melting point, exceptional thermal stability, excellent hydrolytic stability, high stiffness and strength, good toughness and excellent solvent and environmental stress rupture resistance.

Poly(aryl ether ketones) are known in the art as evidenced by Johnson et al, U.S. Pat. Nos. 4,108,837 and 4,174,175; Dahl, U.S. Pat. No. 3,953,400; Dahl et al U.S. Pat. No. 3,956,240; Dahl, U.S. Pat. No. 4,247,682; Rose et al., U.S. Pat. No. 4,320,224; Maresca U.S. Pat. No. 4,339,568; Attwood et al., Polymer, 1981, vol. 22, August, pp. 1096–1103; Blundell et al., Polymer, 1983 vol. 24, August, pp. 953–958; Attwood et al., Polymer Preprints, 20, no. 1, April, 1979, pp. 191–194; and Rueda et al., Polymer Communications, 1983, vol. 24, September, pp. 258–260.

Thus, poly(aryl ether ketones) are well known; they can be made from a variety of starting materials; and they can be made with different melting temperatures and molecular weights. Nominally, poly(aryl ether ketones) are crystalline and can be made tough, i.e., exhibit high values (>50 ft-lbs/in$^2$) in the tensile impact test (ASTM D-1822). They have many uses and may be fabricated into any desired shape, e.g., moldings, coatings, films, or fibers.

Poly(aryl ether ketones) prepared from biphenol as a starting monomer have excellent mechanical properties. However, the melting points of such polymers are over 400° C. Such high molecular weight polymers are difficult to prepare due to the high polymerization temperatures required. Further, due to their high melting points, fabrication by conventional polymer fabrication methods is very difficult.

Thus, there is a desire to lower the melting point of the poly(aryl ether ketones) derived from biphenol without substantially affecting the glass transition temperature (Tg) and, thus, the mechanical and crystallization properties.

European Patent Application, Publication No. 0 184 458, published June 11, 1986, describes aromatic polyetherketones containing the repeat units

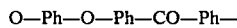    (I)

and

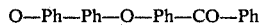    (II)

in the relative molar proportions I:II of 95:5 to 60:40, preferably 90:10 to 60:40. It is stated in this publication that the obtained ketone polymer has similar properties to known polyetherketones but has a lower crystalline melting temperature, thus allowing processing at a lower temperature.

THE INVENTION

It has now been found that the processability of poly(aryl ether ketones) derived from biphenol can be improved by incorporating bisphenol comonomers.

BRIEF DESCRIPTION OF THE DRAWING

The Figure shows the melting temperature (Tm, °C.) of the polymer versus the mole percent of biphenol in the polymer. With 65 mole percent or greater of biphenol in the polymer, the melting temperature of the polymer is 350° C. or greater. Thus, the polymer has a higher use temperature. Further, the crystallization rates of polymers containing 65 mole percent or greater of biphenol are faster compared to polymers containing less than 65 mole percent of biphenol. This results in shorter molding cycles. Also, the polymers containing 65 mole percent or greater of biphenol have enhanced Tg.

DESCRIPTION OF THE PREFERRED EMBODIMENT

In a preferred embodiment, it has been found that incorporation of phenylene ether units, specifically by substituting hydroquinone for part of the biphenol, in the poly(aryl ether ketone) derived from biphenol results in high molecular weight crystalline polymers which still retain high melting points and which can be prepared at reaction temperatures of about 350° C. or less.

The polymers of this invention have high melting points of about 350° C. or above, moderate to good crystallinity, and can be made easily with high molecular weights (which are exceedingly difficult to obtain from poly(aryl ether ketones) prepared solely from biphenol).

The poly(aryl ether ketone) polymers derived from biphenol comprise at least one biphenylene unit and phenylene units, said units separated by ether oxygen and wherein the polymer contains at least one divalent carbonyl radical separating the units.

The poly (aryl ether ketone) may be characterized as containing the following repeating unit:

$$-[Ar-X-]_n$$

wherein n is 2 or greater, Ar is phenylene or biphenylene, with the proviso that at least one of Ar is biphenylene and X is —O—, or

with the proviso that at least one X is

Illustrative of such poly(aryl ether ketones) are the following:

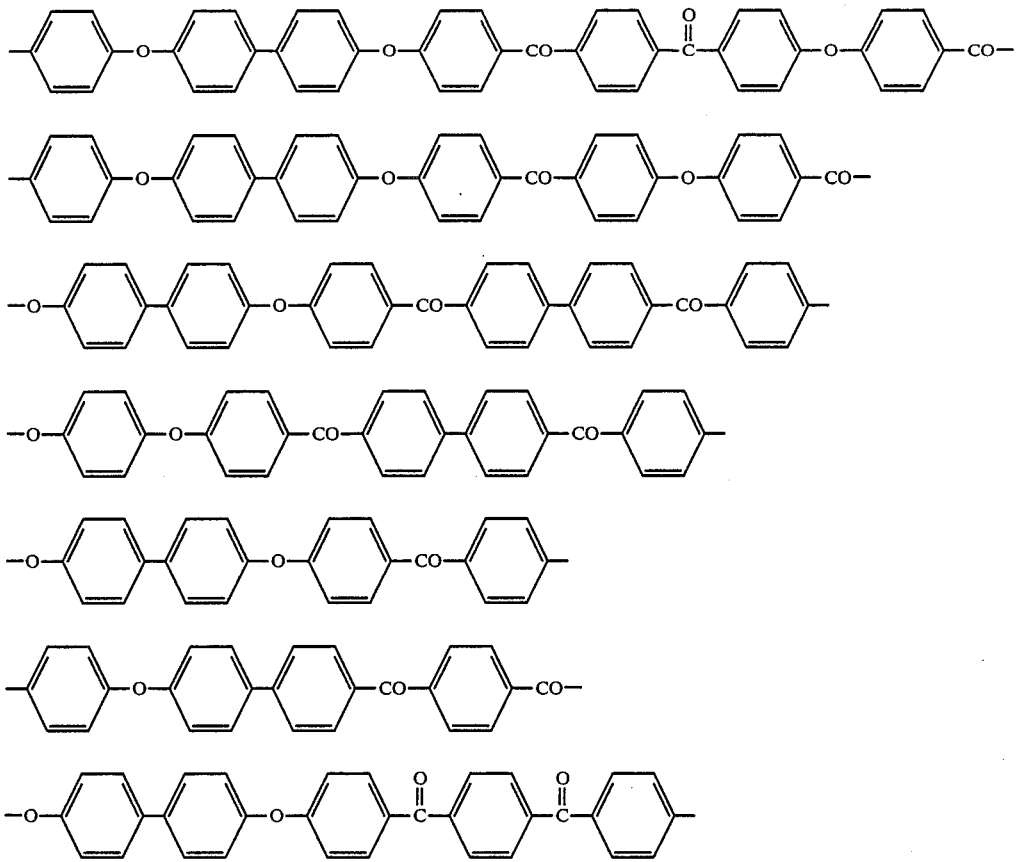

The preferred starting monomers which are used to prepare the poly(aryl ether ketones) include the following:

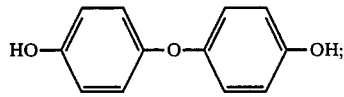

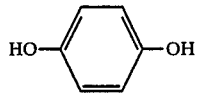

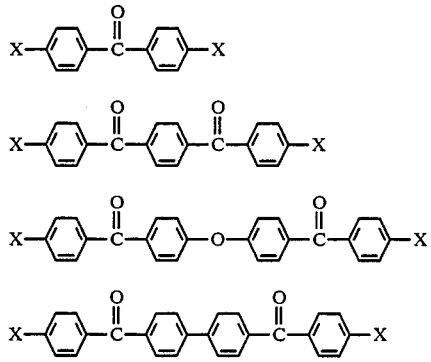

wherein X is chlorine or fluorine, and

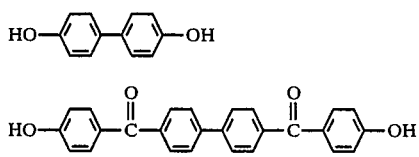

The modifying comonomers which are added to the reaction to modify the biphenol containing poly(aryl ether ketone) include the following:

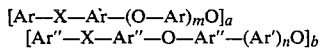

and

HO—⌬—OH

The amount of modifying bisphenol to prepare the copolymers of this invention is such that the ratio (M:B) of comonomer (M) to biphenol (B) is from 35:65 to about 5:95, preferably from about 30:70 to about 10:90, such that the melting point of the resulting copolymer is greater than about 350° C. and less than about 400° C.

The copolymers of this invention may be characterized as containing units of the following formula:

$$[Ar-X-Ar-(O-Ar)_mO]_a$$
$$[Ar''-X-Ar''-O-Ar''-(Ar')_nO]_b$$

wherein Ar is independently phenylene or biphenylene with the proviso that at least one Ar is biphenylene; X is independently —CO— or —CO—Ar—CO—; Ar' is —O—Ar'''—; Ar''' is phenylene; Ar'' is phenylene; n is 0 to 2, m is 0 or 1, and the ratio of a to b is 65:35 to 95:5.

The copolymers of this invention preferably contain units of the following formula:

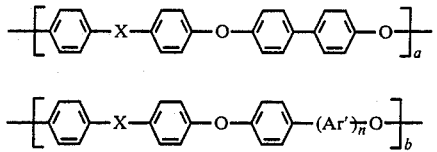

where Ar' and X are defined as above; n is 0 to 2 and the ratio of a/b is >65:35, preferably 75:25.

The polymers of the instant invention are prepared in solution by heating the monomer with a mixture of alkali metal carbonates or bicarbonates. When a mixture of alkali metal carbonates or bicarbonates is used, the mixture comprises sodium carbonate or bicarbonate with a second alkali metal carbonate or bicarbonate wherein the alkali metal of the second carbonate or bicarbonate has a higher atomic number than that of sodium. The amount of the second alkali metal carbonate or bicarbonate is such that there is from 0.001 to about 0.20 gram atoms of the second alkali metal per gram atom of sodium.

The higher alkali metal carbonates or bicarbonates are thus selected from the group consisting of potassium, rubidium and cesium carbonates and bicarbonates. Preferred combinations are sodium carbonate or bicarbonate with potassium carbonate or cesium carbonate.

The alkali metal carbonates or bicarbonates should be anhydrous although, if hydrated salts are employed, where the polymerization temperature is relatively low, e.g., 100° to 250° C., the water should be removed, e.g., by heating under reduced pressure, prior to reaching the polymerization temperature.

Where high polymerization temperatures (>250° C.) are used, it is not necessary to dehydrate the carbonate or bicarbonate first as any water is driven off rapidly before it can adversely affect the course of the polymerization reaction.

The total amount of alkali metal carbonate or bicarbonate employed should be such that there is at least 1 atom of alkali metal for each phenol group. Hence, when using the monomeric or oligomeric diphenols of the instant invention there should be at least 1 mole of carbonate, or 2 moles of bicarbonate, per mole of the aromatic diol.

An excess of carbonate or bicarbonate may be employed. Hence there may be 1 to 1.2 atoms of alkali metal per phenol group. While the use of an excess of carbonate or bicarbonate may give rise to faster reactions, there is the attendant risk of cleavage of the resulting polymer, particularly when using high temperatures and/or the more active carbonates.

The reaction may also be carried out by heating a mixture of the monomers in the presence of sodium carbonate and/or bicarbonate and potassium, rubidium or cesium fluorides or chlorides. The sodium carbonate or bicarbonate and the chloride and fluoride salts should be anhydrous although, if hydrated salts are employed, where the reaction temperature is relatively low, e.g. 100° to 250° C., the water should be removed, e.g. by heating under reduced pressure, prior to reaching the reaction temperature.

Where high reaction temperatures (>250° C.) are used, it is not necessary to dehydrate the carbonate or bicarbonate first as any water is driven off rapidly before it can adversely affect the course of the reaction. Optionally, an entraining organic medium can be used to remove water from the reaction such as toluene, xylene, chlorobenzene, and the like.

The total amount of sodium carbonate and/or bicarbonate and potassium, rubidium or cesium fluoride or chloride employed should be such that there is at least 1 atom of total alkali metal for each phenol group, regardless of the anion (carbonate, bicarbonate or halide). Likewise where a halophenol is employed there should be at least one mole of total alkali metal per mole of halophenol.

Preferably, from about 1 to about 1.2 atoms of sodium for each phenol group is used. In another preferred embodiment from 0.001 to about 0.5 atoms of alkali metal (derived from alkali metal halide) is used for each phenol group.

The sodium carbonate or bicarbonate and potassium fluoride are used such that the ratio of potassium to sodium therein is from about 0.001 to about 0.5, preferably from about 0.01 to about 0.25, and most preferably from about 0.02 to about 0.20.

An excess of total alkali metal may be employed. Hence there may be about 1 to about 1.7 atoms of alkali metal per phenol group. While the use of a large excess of alkali metal may give rise to faster reactions, there is the attendant risk of cleavage of the resulting polymer, particularly when using high temperatures and/or the more active alkali metal salts. Of course it is well known to those skilled in the art that cesuim is a more active metal and potassium is a less active metal so that less cesium and more potassium are used. Further, it has been observed that the chloride salts are less active than the fluoride salts so that more chloride and less fluoride is used.

The reaction is carried out in the presence of an inert solvent.

Preferably the solvent employed is an aliphatic or aromatic sulfoxide or sulfone of the formula

where x is 1 or 2 and R and R' are alkyl or aryl groups and may be the same or different. R and R' may together form a divalent radical. Preferred solvents include dimethyl sulfone, sulfolane (1,1 dioxothiolan), or aromatic sulfones of the formula:

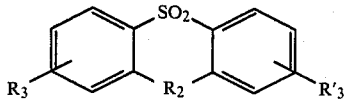

where $R_2$ is a direct link, an oxygen atom or two hydrogen atoms (one attached to each benzene ring) and $R_3$ and $R'_3$, which may be the same or different, are hydrogen atoms and alkyl or phenyl groups. Examples of such aromatic sulfones include diphenylsulfone, dibenzothiophen dioxide, phenoxathiin dioxide and 4-phenylsulfonyl biphenyl. Diphenylsulfone is the preferred solvent. Other solvents that may be used include high boiling amides, e.g. N-cyclohexyl-2-pyrrolidone, and N-phenyl-2-pyrrolidone, and the like.

The polymerization temperature is in the range of from about 100° to about 400° C. and will depend on the nature of the reactants and the solvent employed. The preferred temperature is above 270° C. The reactions are generally performed under atmospheric pressure. However, higher or lower pressures may be used.

For the production of some polymers, it may be desirable to commence polymerization at one temperature, e.g., between 200° and 250° C. and to increase the temperature as polymerization ensues. This is particularly necessary when making polymers having only a low solubility in the solvent. Thus, it is desirable to increase the temperature progressively to maintain the polymer in solution as its molecular weight increases.

To minimize cleavage reactions it is preferred that the maximum polymerization temperature be below 350° C.

The polymerization reaction may be terminated by mixing a suitable end capping reagent, e.g., a mono or polyfunctional halide such as methyl chloride, or 4,4'-dichlorodiphenylsulphone with the reaction mixture at the polymerization temperature, heating for a period of up to one hour at the polymerization temperature and then discontinuing the polymerization.

EXAMPLES

The following examples serve to give specific illustrations of the practice of this invention but they are not intended in any way to limit the scope of this invention.

CONTROL A

A 500 ml resin kettle was fitted with a stainless steel stirrer, stainless steel gas inlet tube, a stainless steel thermocouple connected to a temperature indicator-controller, and a Dean-Stark trap topped by a condenser. The resin kettle was charge with:

Hydroquinone, 16.52 g 0.15 moles
Biphenol, 9.31 g 0.05 moles
4,4'-Difluoro benzophenone, 43.64 g 0.20 mole
Sodium carbonate, 20.56 g 0.194 moles
Potassium carbonate, 1.382 g 0.010 moles
Diphenyl sulfone, 143.4 g The reaction mixture was heated to 200° C. and maintained there for one hour. The temperature was then raised to 250° for 15 minutes and then to 320° C. It was held at 320° for one hour, then cooled and let stand under nitrogen at room temperature overnight. The next day it was reheated to 320° C. and held there for 2.5 hours for a total of 3.5 hours at 320° C. The reaction was terminated by the addition of 2 g of 4,4'-dichlorodiphenyl sulfone followed by heating for an additional 0.5 hours at 320° C.

The hot contents of the resin kettle were poured into a teflon coated pan and the resulting cooled solid ground in a Wiley Mill. The granular product was extracted two times for one hour with boiling acetone and two times for an hour with boiling water.

The resulting polymer had a reduced viscosity (RV) of 1.38 dl/g (1% in concentrated sulfuric acid at 25° C.) and a melting point (M.P.) of 298° C. by DSC. The results are shown in Table I.

CONTROL B

Control A was repeated except the charge was modified as follows:

Hydroquinone, 11.01 g 0.1 mole
Biphenol, 18.62 g 0.1 mole

The resulting polymer had, after 3.5 hours at 320° C., an RV of 2.00 dl/g (1% in concentrated sulfuric acid at 25° C.) and a M.P. of 312° C. by DSC. The results are shown in Table I.

EXAMPLE 1

Control A was repeated except the charge was modified as follows:

Hydroquinone, 5.51 g 0.05 moles
Biphenol, 27.93 g 0.15 moles

The reaction mixture was heated for about four hours at 320° C. The resulting polymer had an RV of 1.59 dl/g (1% in concentrated sulfuric acid at 25° C.) and a melting point of 383° C. by DSC. The results are shown in Table I.

CONTROL C

Control A was repeated except the charge was modified as follows:

Hydroquinone, 0.00 g 0.00 moles
Biphenol, 37.62 g 0.20 moles

The reaction mixture was heated at 320° C. for 2.5 hours and 340° C. for 1.5 hours. The resulting polymer had an RV of 0.97 dl/g (1% in concentrated sulfuric acid at 25° C.) and a M.P. of 428° C. by DSC. The results are shown in Table I.

CONTROL D

Example 1 was repeated except the charge was modified as follows:

Hydroquinone, 22.02 g 0.20 moles
Biphenol, 0.00 g 0.00 moles

The reaction mixture was heated at 320° C. for 3 hours. The resulting polymer had an RV of 1.18 dl/g (1% in concentrated sulfuric acid at 25° C.) and a M.P. of 335° C. by DSC. The results are shown in Table I.

The data in Table I shows that a poly(aryl ether ketone) derived from biphenol (Control C) has a very high melting point of 428° C. Substituting hydroquinone for the biphenol (Example 1) lowers the melting point of the polymer but not excessively so as compared to Controls A and B which even fall below the melting point of Control D. This is illustrated in the Figure.

TABLE I

| CONTROL: | A | B | C | D | Example 1 |
|---|---|---|---|---|---|
| Hydroquinone | 0.15 | 0.10 | 0 | 0.20 | 0.05 |
| Biphenol | 0.05 | 0.10 | 0.20 | 0 | 0.15 |
| 4,4'-Difluorobenzophenone | 0.20 | 0.20 | 0.20 | 0.20 | 0.20 |
| RV (dl/g) | 1.38 | 2.00 | 0.97 | 1.18 | 1.59 |
| MP (°C.) | 298 | 312 | 428 | 335 | 383 |

What is claimed is:

1. A poly(aryl ether ketone) containing units of the following formula:

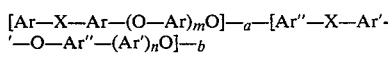

wherein Ar is independently phenylene or biphenylene, with the proviso that at least one Ar is biphenylene; X is independently —CO— or —CO—Ar—CO—; Ar' is —O—Ar'''—; Ar''' is phenylene; Ar'' is phenylene; n is 0 to 2; m is 0 or 1; and the ratio of a-to-b is 65:35 to 95:5.

2. A poly(aryl ether ketone) as defined in claim 1 containing units of the following formula:

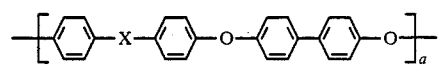

-continued
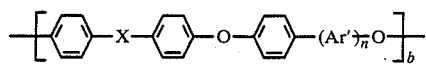
wherein the ratio of a to b is 65:35 to 95:5.
3. A poly(aryl ether ketone) of the following formula:
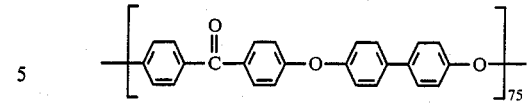
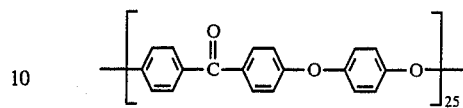
having a crystalline melting point greater than about 350° C.
4. A poly(aryl ether ketone) as defined in claim 1 having a crystalline melting point greater than about 350° C.
* * * * *